United States Patent [19]

Ting et al.

[11] 4,335,028

[45] Jun. 15, 1982

[54] CATHODIC ELECTROCOATING COMPOSITIONS CONTAINING BASE-FUNCTIONAL GRAFT POLYMERS HAVING EPOXY RESIN BACKBONES, AND SUBSTRATES COATED THEREWITH

[75] Inventors: Vincent W. Ting, Boulder, Colo.; James T. K. Woo, Medina; David A. Borovicka, Sr., Parma, both of Ohio

[73] Assignee: SCM Corporation, New York, N.Y.

[21] Appl. No.: 188,996

[22] Filed: Sep. 22, 1980

[51] Int. Cl.³ .............................................. C08L 63/00
[52] U.S. Cl. ................................ 524/504; 204/181 C; 428/418; 525/63
[58] Field of Search ............... 260/29.2 EP, 29.6 NR, 260/33.2 EP; 525/63, 524, 530; 204/181 C; 428/418

[56] References Cited

U.S. PATENT DOCUMENTS

| | | | |
|---|---|---|---|
| 3,028,359 | 4/1962 | Gaylord | 260/45.2 |
| 3,336,253 | 8/1967 | Wong et al. | 260/29.2 |
| 4,039,414 | 8/1977 | McGinniss | 204/181 |
| 4,212,781 | 7/1980 | Evans et al. | 260/29.4 UA |

*Primary Examiner*—Theodore E. Pertilla
*Attorney, Agent, or Firm*—Thomas M. Schmitz

[57] ABSTRACT

A base-functional graft polymer-containing resinous reaction product is made by incorporating an amine in a graft polymer molecule. An epoxy resin is reacted with ethylenically unsaturated monomer in the presence of a free radical initiator having hydrogen abstraction capability, to form a graft polymer resinous reaction product. The monomer may comprise a copolymerizable unsaturated amine or an unsaturated epoxide that, after the addition polymerization - grafting reaction, is reacted with a primary or secondary amine. Upon the addition of an ionizing agent and water, an aqueous dispersion or solution can be established.

The resinous reaction products are useful in the formulation of coating compositions, and particularly, coating compositions useful for cathodic electrocoating.

32 Claims, No Drawings

CATHODIC ELECTROCOATING COMPOSITIONS CONTAINING BASE-FUNCTIONAL GRAFT POLYMERS HAVING EPOXY RESIN BACKBONES, AND SUBSTRATES COATED THEREWITH

RELATED PATENT APPLICATIONS

This application is related to Ser. No. 793,507, filed May 4, 1977 and now abandoned, which is published as Belgian Pat. No. 854,523, granted Nov. 14, 1977, as German OS No. 2,721,823.1, and as Dutch patent application 77.05236, published Nov. 11, 1977. Application Ser. No. 793,507 in turn was a continuation-in-part of Ser. No. 788,454, filed Apr. 18, 1977, and now abandoned, which in turn was a continuation-in-part of Ser. No. 685,246, filed May 11, 1976, and now abandoned.

This patent application is also related to Ser. No. 788,611, filed Apr. 18, 1977 now U.S. Pat. No. 4,212,781, which has been published as Belgian Pat. No. 854,476, granted Nov. 10, 1977, and as German OS No. 2,721,822, published Nov. 24, 1977. Application Ser. No. 788,611 in turn was a continuation-in-part of Ser. No. 685,246, filed May 11, 1976, and now abandoned.

The subject matter of the present patent application thus is related to the subject matter of several other pending patent applications, the teachings of which are all incorporated herein by reference.

FIELD OF THE INVENTION

This invention relates to cathodic electrocoating compositions containing novel resinous compositions, and to processes for making them. More particularly, the invention is concerned with water-reducible cathodic electrocoating compositions.

BACKGROUND OF THE INVENTION

Graft polymers, formed between epoxy resins and addition polymers, generally formed from monomer including an acrylic acid, are suggested in the earlier applications referred to above, and in certain prior art for use in coating compositions.

In the art prior to these applications, it appears that the so-called graft polymer has been an adduct formed by an esterification reaction between an acidic addition polymer and an epoxy resin. The techniques for making these epoxy-based acidic adduct resins water-dispersible, through inversion with amines, and for cross-linking them with added aminoplast, are well known. None of the prior art adduct products has been fully satisfactory. The adducts and coating compositions formed from them do not have good resistance to weather, because the adducts are susceptible to hydrolysis.

In application Ser. No. 685,246, there are disclosed processes for making water-reducible curable resinous compositions and coatings. In one embodiment, the application discloses a process for preparing a curable resinous composition having an Acid Number of at least 30, by reacting together at 90° C. to 130° C. an aromatic diepoxide resin having a molecular weight above 1,000 and addition polymerizable monomer of which from 10% to 80% by weight is an acrylic acid, the diepoxide resin being present in sufficient quantity to provide from 30% to 90% by weight of the initial reaction mixture, in the presence of a free radical initiator of the benzoyl peroxide type. During the reaction there is simultaneous addition polymerization of the monomer through its ethylenic unsaturation and grafting of addition polymer to the diepoxide resin. The graft polymer resinous reaction product is characterized by the substantial absence of hydrolyzable functional groups. The acid functionality of the reaction mixture is sufficiently high to effect stable dispersion of the product in a basic aqueous medium.

As is more particularly pointed out in patent application Ser. No. 788,611, now U.S. Pat. No. 4,212,781 the resinous reaction product produced contains three polymeric components, namely, the graft polymer ungrafted diepoxide resin, and ungrafted addition polymer.

As is pointed out in Ser. No. 793,507, now abandoned the initial epoxy resin, that is employed in the graft polymer production process, may be terminated to eliminate part or all of the terminal epoxy groups, so as to reduce or eliminate the possibility of ester grafting.

In these prior applications, the initial epoxy resin is modified to make it dispersible in water. This is accomplished by incorporating ionizable groups in the epoxy resin molecules. In Ser. No. 793,507, now abandoned it is disclosed that these ionizable groups may be acid-functional or base-functional, and that base functionality can be obtained by the introduction of amino nitrogen into the epoxy resin molecule by the reaction of a primary or secondary amine with the terminal epoxy groups; see Ex. 6 of Ser. No. 793,507 now abandoned.

The ionized reaction products of these prior applications appear to have remarkable properties. They are believed to serve as the means by which the ungrafted epoxy resin component is kept in stable suspension.

While resinous coating compositions of the kinds disclosed in these prior applications have excellent functional characteristics and other highly desirable properties, their high content of epoxy resin increases their cost. In addition, these resinous coating compositions contain liquid organic solvents, which are used to facilitate handling during the manufacturing process, and to improve application properties such as sprayability.

In another related patent application, Ser. No. 029,106 filed Apr. 11, 1979, now U.S. Pat. No. 4,285,847 the disclosure which is also incorporated herein be reference, the aqueous dispersions described in these prior applications are used as vehicles in which to conduct in situ vinyl polymerizations. One preferred vinyl monomer that can be used for this purpose is styrene, although mixtures of monomers may be employed. The in situ vinyl polymerization step permits the addition of more water, and thus serves, while increasing the content of solids in the composition, to reduce the proportion of liquid organic solvent in the overall composition.

BRIEF SUMMARY OF THE INVENTION

In one aspect, the invention is concerned with an aqueous dispersion that can be formulated into a very useful cathodic electrocoating composition. Such a dispersion comprises a modified epoxy resin in an aqueous vehicle that contains an ionizing agent that ionizes base-functional ionizable groups of the modified epoxy resin sufficiently to establish the modified resin in dispersed form in the aqueous vehicle.

In another aspect, the invention is concerned with a modified aromatic 1,2-epoxy diepoxide resin that is particularly useful as the binder for a cathodic electrocoating and that has, in its unmodified state, an epoxy equivalent weight (EEW) of at least 300 and a molecular weight of at least 600, and that as modified, has incorporated in its molecules base-functional ionizable groups. These ionizable groups are present in a quantity sufficient to establish the modified resin as a dispersion upon ionization in an aqueous vehicle.

In a further aspect, the invention provides a process for modifying a 1,2-epoxy resin to render it water-dispersible, by incorporating in the epoxy resin base-functional ionizable groups in a quantity sufficient, upon ionization in an aqueous vehicle, to establish the resin as a dispersion.

The modified epoxy resin is terminated to eliminate some or all of the terminal epoxide groups, either by reaction with a chemical terminating agent such as an acid or hydroxyl compound, often a polyfunctional acid or phenol, or by reaction with a primary or secondary amine, or by a combination of both. The amine reaction introduces some base functional, ionizable groups into the molecule, but often these alone will not render the resin solids dispersible. Dispersibility is imparted by forming a graft polymer in which the epoxy resin serves as the backbone component and addition copolymer, formed from ethlenically unsaturated monomer, forms the side chain component. Ionizable sites are located on the side chains, preferably in the form of tertiary amino nitrogens.

One way of making an ionizable graft polymer is by reacting the epoxy resin with a terminating agent, to eliminate the epoxy groups and form a terminated resin, and then reacting the terminated resin with ethylenically unsaturated monomer comprising an ethylenically unsaturated amine, in the presence of more than 3% by weight of the monomer of benzoyl peroxide or equivalent peroxide initiator, simultaneously to cause addition polymerization of the monomer and grafting of addition copolymer to aliphatic backbone carbons of the epoxy resin in the form of side chains. Another way of making ionizable graft polymer is by reacting the epoxy resin with ethylenically unsaturated monomer comprising an epoxy acrylate such as glycidyl methacrylate, to produce a graft polymer resinous reaction product having epoxy functionality which is then aminated to produce a resin containing ionizable sites.

The terms "graft polymer resinous reaction product" or, where appropriate, "resinous reaction product", are used herein to refer to the reaction mixture that is produced by the addition polymerization of ethylenically unsaturated (vinyl) monomer in the presence of an epoxy resin, or a terminated epoxy resin, that has aliphatic backbone carbons having one or two hydrogens bonded thereto in the ungrafted state, in the presence of at least 3% benzoyl peroxide (BPO) or equivalent hydrogen-abstracting initiator, based on monomer.

The aqueous dispersions produced from the base-functional modified epoxy resins of the present invention may be employed in formulating cathodic electrocoating compositions, and also as vehicles for carrying out one or more in situ vinyl polymerizations to produce dispersions with desired functional characteristics but containing relatively larger amounts of vinyl polymers as a part of their film-forming solids contents.

Detailed Description of the Prior Inventions

The Processes and Products of the Earlier Applications

The prior inventions of the earlier applications are most easily understood from a description of one specific preferred embodiment.

When making a sprayable sanitary coating composition in accordance with one preferred embodiment of the earlier-filed patent applications described above, 70 to 80 parts by weight of a diepoxide resin (a diglycidyl ether of bisphenol A) are placed in a reaction vessel with a small amount of a solvent, such as, for example, 2-butoxy-ethanol-1. The epoxy resin may be purchased and used as is, in which case an initial molecular weight resin of about 8,000 (EEW about 4,000) is preferred, or alternatively, a low molecular weight epoxy resin may be reacted further with bisphenol A to produce an epoxy resin having a molecular weight of about 8,000.

A mixture of monomers containing ethylenic unsaturation is then prepared. In one preferred embodiment, this mixture is formed from about 65 weight percent methacrylic acid, 34 weight percent styrene, and 1 weight percent ethyl acrylate. Benzoyl peroxide (BPO) is incorporated in the mixture in an amount equivalent to about 6.7% of the monomer mixture by weight. This mixture is then added to the reaction vessel containing the epoxy resin over a period of time, at a temperature in the range from 110° C. to about 130° C., preferably about 118° C., to cause the reaction to go forward. Sufficient butanol and 2-butoxy-ethanol-1 are added to facilitate agitation.

It is very difficult to make an accurate analysis of the reaction product that is obtained. However, current indications are that on a dry solids basis, the reaction product from the reaction of about 80 parts of epoxy resin and about 20 parts of ethylenically unsaturated monomer in the presence of about 1.4 parts of benzoyl peroxide (all parts being by weight) contains three different components, as follows:

1. about 37.6% of unreacted epoxy resin;
2. about 7.2% by weight of ungrafted addition polymerized (vinyl) monomer, and
3. about 55.2% of a graft polymer, in which 64% of the original addition polymerizable monomer has grafted (as addition copolymer) to about 53% of the original epoxy resin.

Studies on this reaction and the product produced indicate that grafting takes place at aliphatic backbone carbons of the epoxy resin that have either one or two hydrogens bonded thereto in the ungrafted state. Pictorially, bonding takes place at one of the carbons indicated by the arrows below:

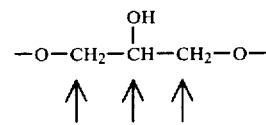

The graft polymer product consists of an epoxy resin molecule, of about 8,000 molecular weight, grafted with, on the basis of statistically averaged information, about two short chains of addition copolymer per molecule of epoxy resin, the molecular weight of each chain being about 1,000, so that the molecular weight of the graft polymer itself is about 10,000. This structure is one that can be represented generally as follows:

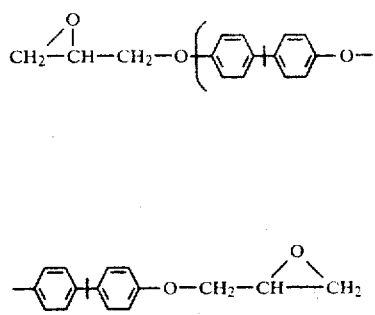 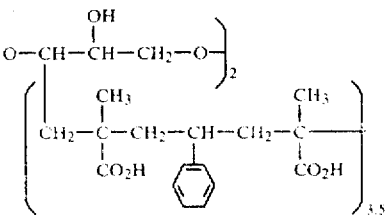

Gel permeation chromatography indicates that the molecular weight of the unreacted epoxy resin in the final product is somewhat lower than that of the initial epoxy resin, indicating that higher molecular weight epoxy resin molecules tend to be grafted preferentially. This probably occurs because there are more grafting sites per molecule in the higher molecular weight epoxy resin molecules.

The available analytical data also indicates that during the polymerization of the addition polymerizable (vinyl) monomer, very little homopolymer is formed.

The resinous reaction product, which is a mixture of the three components described, has an Acid Number of about 85, and a percent oxirane, as determined by the analytical method described in the patent applications described above, of about 0.35, or less.

During the manufacturing process, the solvent content of the product is adjusted periodically so that in this preferred embodiment, the final product is about 58%–60% by weight solids, the balance being a solvent system consisting of a mixture of n-butanol and 2-butoxy-ethanol-1.

To prepare a coating composition useful for spray application to cans for beverages, the resinous reaction product is mixed with deionized water and a fugitive base, which in the preferred embodiment is dimethyl ethanolamine. Sufficient water is employed so that the non-volatiles content of the composition is about 21% to 24%, with a pH of about 7.8. Advantageously about 5% to 10% by weight of the initial epoxy resin of a suitable crosslinking aminoplast resin, such as, for example Cymel 370, a product of American Cyanamid Company, is then added. After thorough mixing, the resulting dispersion remains stable on storage indefinitely. It sprays readily, with particularly good application properties. It cures rapidly on baking. The coatings produced are bland, and do not impart any undesirable organoleptic property or haze to a canned beverage or other food product.

The difficulty in analyzing the resinous reaction product obtained from the graft polymerization step cannot be overemphasized. Moreover, the composition of the product obtained depends upon the initial molecular weight of the epoxy resin, the proportions of the reactants, and the amount of BPO or equivalent initiator employed, among other factors. Consequently, for the preferred embodiment described above, the analytical data reported should be understood to be approximate. The proportion of the molecular weight of the graft polymer that is contributed by the addition polymer side chains is particularly difficult to determine, but probably is in the range from about 16% to about 20%.

One of the interesting properties observed, as to the resinous reaction product, is that the Tg of the resinous reaction product is about 30° C.–65° C. This compares with much higher Tg values for the initial epoxy resin component; for a copolymer that is prepared by the addition polymerization of a monomer mixture such as is used; and for a mixture of the initial epoxy resin with such a copolymer; the Tg values for these being, respectively, generally in the range from about 80° C. to 85° C.; about 110° C.; and about 75° C. to 80° C.

Sprayable sanitary coating compositions are subject to many demanding requirements. Many other coating applications are not so demanding, and the particular components employed, and their proportions, for making the resinous reaction product containing the graft polymer, are subject to a rather broad discretion, depending upon the intended application. Thus, according to the broader aspects of the earlier developments, the epoxy resin employed may have a molecular weight in the range from about 350 to about 40,000 or higher, the limiting factor being the ability to handle the epoxy resin on a practical commercial basis. The amount of epoxy resin may be in the range from about 5% by weight to about 95% by weight of the initial reaction mixture, dry solids basis.

To make a sprayable sanitary coating composition, the molecular weight of the epoxy resin preferably is in the range from 4,000 to 40,000, or more preferably for practical manufacturing processing, in the range from about 8,000 or 12,000 or so. The proportion of epoxy resin in the initial reaction mixture may be from 50% to 90%, and preferably, it is from about 60% to about 90% by weight, and most preferably, 70% to 80%. Sufficient methacrylic acid or the equivalent should be employed in the monomer component so that the Acid Number of the graft polymer resinous reaction product, based on solids, is in the range from 80 to 90. For use it is dispersed in water and preferably a cross-linker is added. The coating is baked to cure it.

The resinous reaction product can also be employed in the formulation of powdered coatings. For this type of application, a small amount of epoxy resin of low molecular weight is adequate. While solvents may be employed, generally a bulk melt reaction is adequate. For this type of application, the resinous reaction product should be formulated to have a Tg of about 65° C.

For all of these applications, where a non-terminated epoxy resin is employed, the amount of benzoyl peroxide or other equivalent initiator employed should be at least 3% by weight based on the monomer, preferably more than 4% and most preferably in the range from about 6% to 7%. This permits the use of reaction temperatures in the range from about 110° C. to about 130° C., for efficient operation. If the epoxy resin is terminated, however, higher reaction temperatures can be employed. If active epoxy groups are present, temperatures above about 130° C. tend to favor ester formation, rather than carbon-to-carbon grafting.

Detailed Description of the Present Invention

General

Epoxy resins of the kind formed by the reaction of epichlorohydrin with bisphenol A generally are characterized by good ability to wet metal surfaces, and by good adhesion to metal surfaces. They form excellent barrier films that are highly corrosion resistant. They can be formed into solutions in liquid organic solvents, but past attempts to formulate epoxy resins into water-reducible compositions have generally not been satisfactory, aside from the compositions described in the earlier-filed patent applications described above.

Water-dispersible compositions containing epoxy resins are provided by the present invention. Such compositions include a graft polymer having an epoxy backbone component and an acrylic copolymer side chain component. The epoxy resin component preferably is derived from an aromatic 1,2-epoxy diepoxide resin that has, prior to grafting, an epoxy equivalent weight (EEW) of at least 300, and a molecular weight (MW) of at least 600, and preferably an EEW of at least about 1,000. In terms of aliphatic carbon atoms, grafting sites per epoxy resin molecule, this means a minimum of at least one grafting site, and preferably five or more with an epoxy of preferred molecular weight grafting sites being at those aliphatic backbone carbons of the epoxy resin that have one or two hydrogens bonded thereto in the ungrafted state.

The graft polymer has incorporated in it base-functional ionizable groups in a quantity sufficient to establish the graft polymer as a dispersion upon ionization in an aqueous vehicle. These ionizable groups are located on the addition copolymer side chain component. Additional ionizable groups may be added by reacting terminal epoxide groups of the epoxy resin with a primary or secondary amine.

In one preferred embodiment of the invention, the selected epoxy resin is subjected to a grafting reaction with ethylenically unsaturated monomer, usually a monomer mixture including an epoxy acrylate such as glycidyl methacrylate, in the presence of more than 3% by weight based on the monomer of BPO or equivalent initiator. This reaction forms a resinous reaction product containing graft polymer, addition copolymer, and unreacted epoxy resin. Both the graft polymer and the addition copolymer contain epoxide groups that can be aminated to produce base functional, ionizable polymers. If the ungrafted epoxy resin retains its terminal epoxide groups, these may be aminated also, so that all of the resinous solids present become base functional and ionizable.

In another preferred embodiment of the invention, the epoxy resin is reacted with a terminating agent, to eliminate some or all of the epoxy groups and form terminated resin, and then the terminated resin is reacted with ethylenically unsaturated monomer including an ethylenically unsaturated amine.

Chemical termination to eliminate the terminal epoxy groups is beneficial in these cases for two reasons. One important reason is that an amine, including an ethylenically unsaturated amine, would tend to react through its amine groups with the terminal epoxy groups, rather than in the desired way. Secondly, in the presence of an amine, any acid that is formed as a decomposition product of the initiator, such as benzoic acid from benzoyl peroxide, would tend to esterify the terminal epoxy groups.

To effect chemical termination in accordance with the present invention, a large number of satisfactory materials are available for use as the terminating agents, including phenols, carboxylic and other acids, primary and secondary amines, mercaptans, alcohols, water (all having hydrogen atoms reactable with oxirane groups) and other terminating agents also reactable with oxirane groups, eg., acyl halides, alkyl halides, ketones, Grignard reagents ($RM_gX$), cyanates, cyanoacetates, diborane, $CO_2$ and $CS_2$. With monofunctional reactivity towards epoxy groups such agents do not extend the epoxy resin while eliminating the epoxy groups. With difunctionality such as in a dicarboxylic acid or a diphenol, the average molecular weight of the epoxy resin can be built up to terminate with a carboxylic or phenolic hydroxyl group. With a primary amine used in fairly high concentration and reacted rapidly, termination can take place without chain extension of the epoxy resin, whereas the low amine concentration, such extension of the epoxy resin can be made to occur during termination.

The grafting step involves reacting an epoxy resin, preferably terminated, with addition polymerizable monomer, that may be in the form of either a single monomer or a mixture of monomers that contain ethylenic unsaturation and that are copolymerizable to form an addition copolymer. Where the product is to be dispersed or dissolved in an aqueous vehicle, at least one of these monomers is either an unsaturated epoxide or an unsaturated amine.

When the epoxy resin is grafted with monomer containing ethylenically unsaturated epoxide first, then aminated, the grafting temperature should be around 115°-120° C., and the epoxy resin component and the monomer mixture are reacted together in the presence of more than 3% of benzoyl peroxide (BPO), preferably 5% to 8%, by weight of the polymerizable monomer, at about 110° C. to about 120° C. Otherwise, there would be side reactions, at higher temperatures, involving mostly the epoxy functionality. Alternatively, any other free radical initiator can be used that furnishes equivalent free radical initiating activity and that has the ability to abstract hydrogen from aliphatic backbone carbon atoms of the epoxy resin.

When the proportion of BPO or equivalent free radical initiator is sufficient to be the equivalent of more than 5% by weight of BPO, based on monomer, the grafting occurs at aliphatic backbone carbons of the epoxy resin that have one or two hydrogens bonded thereto in an ungrafted state. When a greater amount of BPO than about 8% is employed, or equivalent, greater expense is incurred without any particular advantage yet noted. However, amounts of free radical initiator as high as 15% equivalent of BPO by weight of the addition polymerizable monomer can be used.

If the epoxy resin is terminated first, then the grafting process can take place at a higher temperature, such as 165° C.–170° C. with the use of other initiators. The initiator can be any free radical source capable of hydrogen abstraction, such as, for example, the alkyl peroxy esters, alkyl peroxides, alkyl hydroperoxides, diacyl peroxides, and the like, particularly, dicumyl peroxide, di-t-butyl peroxide, t-butyl perbenzoate, t-butyl hydroperoxide, 2,5-dimethyl-2,5-di(t-butyl peroxy)hexane, p-menthane hydroperoxide, and the like.

The products produced are resinous blends of: graft polymer in which addition polymer is grafted to aliphatic backbone carbon atoms of the epoxy resin; ungrafted epoxy resin, which may be terminated; and ungrafted addition polymer.

The backbone of an initial epoxy resin is the aliphatic carbon chain portion of the resin other than any residual unreacted oxirane group and, where an oxirane group has been eliminated by the termination, generally excludes those carbons that formerly were oxirane carbons or were adjacent oxirane carbon.

The resinous reaction product may be characterized as a mixture of unreacted epoxy resin and two associatively formed polymers. One of these polymers is the graft polymer, formed by carbon-to-carbon bonding of addition polymer to some of the aliphatic backbone carbons of the epoxy resin that generally are those having two hydrogens bonded thereto in the ungrafted state. The other polymer is addition (vinyl) polymer, formed from the monomer present, and not grafted.

The grafting forms especially durable linkages, modifying sufficient of the epoxy resin present to exert a profound influence on the properties of the product mixture as well as to impart lasting characteristics of the grafted-on addition polymer to the epoxy resin receptor. Thus, for example, such grafted addition polymer would be expected to improve the epoxy receptor's resistance to outdoor exposure. Also, such a product blend is highly resistant to undesirable reaction in and precipitation from an aqueous dispersion and the suspending influence of the ionized graft polymer in combination with associatively-formed ionized base-functional vinyl copolymer, and other components present in such resinous blend, appears to be remarkable.

The present invention thus provides a technique for making polymer blends that contain graft polymer and ungrafted addition polymer, so as to improve upon their respective properties. When the addition polymerizable monomer includes a sufficient quantity of an unsaturated amine, or of an unsaturated epoxide that is subsequently aminated, both the graft polymer and the ungrafted addition polymer, that are produced, are base-functional, and in the presence of a suitable amount of neutralizing or ionizing agent, the reaction product may be dispersed in an aqueous vehicle. For stable dispersion in an aqueous vehicle, the Base Number (N.V.) of the resinous reaction product should be sufficient for establishing and maintaining the resinous reaction product in the dispersion.

The effects of graft polymerization in accordance with this invention can be observed, in the case of water-reducible coatings, when there is sufficient base functionality so that stable dispersions are formed. There are different ways in which this can be measured. Thus, the addition polymer, when formed from amine-containing polymerizable monomer, will contain ionizable nitrogen, preferably tertiary amino nitrogen. The amount of ionizable nitrogen required is best determined by the practical test of observing how much is required for satisfactory dispersibility. Dispersability in turn reflects the strength and degree of ionization, as well as such other factors as pH of the dispersion, hydrophobicity of the polymers present, degree of stability needed, and the like.

As an approximation, when the ionizable nitrogen present in the resinous reaction product is tertiary amino nitrogen, the tertiary nitrogen can be as high as 10% and should be in the range from about 0.02% to about 5% by weight of the tertiary amino nitrogen based on solids, provided that if the nitrogen is quaternized, then the weight of the quaternary nitrogen present can generally be less than about 0.2%, since quaternary nitrogen is characteristically strongly ionized. However, when the initial reaction mixture is low in either epoxy resin, unsaturated epoxy, or unsaturated amine, this measurement alone may not suffice. Accordingly, it is best to couple this measurement with a Base Number value for the entire reaction mixture, which value should be above 20 and generally will not exceed 100. A preferred range is from about 30 to about 50.

Generally, to secure the benefits of the invention, the amount of starting epoxy resin should be sufficient so that such epoxy resin constitutes at least 5% of the initial reaction mixture by weight, and preferably at least 10%, up to about 60%. Preferred binder blends are obtained when the amount of epoxy resin is from 15% to 40% by weight of the initial reactants, and from 20% to 30% produces more preferred binders. The balance is derived from the acrylic components.

One important feature of the process of the invention is the unusually high proportion of free radical initiator relative to addition polymerizable monomer that is used in the reaction. For practical results such proportion should be used to initiate the addition polymerization and grafting reactions rather than to use some of such proportion to finish off such reactions. The proportion of benzoyl peroxide, used at about 110° C. to 120° C. or so, must be more than 3% based on the weight of addition polymerizable monomer, and preferably is at least 4%. A useful practical preferred range is 6% to 7%, although up to 15% or more can be used. When some other equivalent free radical initiator with hydrogen extraction capability is used, the amount can be adjusted to be equivalent in activity for this particular reaction, taking the temperature of use into account.

While a preferred grafting reaction technique involves placing the epoxy component and a solvent for it in a reactor, and then slowly adding the mixture of the selected monomers, free radical initiator, and solvent, over a period of time that permits facility of control over the exothermic heat, other approaches to the process can be employed. For example, the epoxy resin and a solvent for it can be placed in a reactor, then all of the initiator and part of the monomer mixture may be added. After an initial reaction, taking place upon heating, the remainder of the monomer mixture may be added slowly over a period of time. As a variation on this process, some of the free radical initiator may be retained for addition to the reactor along with the monomer mixture. As a further alternative, the monomer mixture, epoxy resin component, and any desired solvents, may be placed in a reactor, and the initiator added slowly.

Once the final reaction product is obtained, it is generally useful to disperse it in an aqueous vehicle, to facilitate its application as a coating composition, using an ionizing agent or a mixture of such agents. A preferred ionizing agent is lactic acid, and it is normally used in an amount from about 50% of the amount theoretically required for complete reaction with the available nitrogen, up to a slight excess.

For a given dispersion, the proportion of ionizing agent used affects the resulting viscosity of the water-borne system. Higher levels of ionizing agent produce higher viscosities and require larger amounts of water dilution for viscosity control.

Two processing procedures are preferred for converting the resinous reaction product to a stable waterborne system. For ease of manufacture, the more preferred procedure involves adding the product, with organic solvent, to a mixture of water and ionizing agent, with agitation. Usually a small amount of hydrophilic solvent (ethylene glycol monobutyl ether or the like) is included in the water to aid in dispersing the resin therein. In the second procedure, water and the ionizing agent are added to the polymer blend and solvent, with agitation. While the water-borne system prepared by this second procedure is satisfactory, this procedure is not preferred for best equipment utilization.

For many applications for aqueous dispersion coating compositions prepared in accordance with the present invention, the nature of the ionizing agent is not important except insofar as it produces dispersibility, and substantially any compound that behaves as an acid may be used for forming the salt. Most mineral acids and many organic acids, especially carboxylic and sulfonic acids and their salts, are suitable in the practice of this invention. Acids containing complex anions and acid phenols and acid-nitro compounds are also suitable. However, for cathodic electrocoating, it is preferable to use acids that present no disposal or corrosion problems when the coating is used in a conventional electrocoating apparatus, and the preferred ionizing agents are hydroxy acids such as lactic acid, and low molecular weight fatty acids such as acetic acid.

Some other specific compounds which are suitable for the formation of the salt are, for example, hydrochloric acid, sulfuric acid, nitric acid, and phosphoric acid. Formic acid, dichloroacetic acid, methoxyacetic acid, glycolic acid, lactic acid, oxalic acid, succinic acid, malic acid, tartaric acid, propionic acid, glutaric acid, adipic acid, B-hydroxypropionic acid, benzoic acid, and ascorbic acid, are also suitable.

These compounds may be used either alone or in combination, and similarly the reaction can take place in the presence of monofunctional or polyfunctional quaternizing agents. Suitable monofunctional and polyfunctional quaternizing agents are for instance chloracetic acid, ethylene chlorhydrin, bromoethanol, dibromobutane, and bromoacetic acid. It has also been found to be possible to use different salt-forming and quaternizing agents successively.

In addition to forming a graft polymer having base functionality in its side chains, it is possible to react the initial epoxy resin, the graft polymer, or residual ungrafted epoxy resin, with a primary or secondary amine, in order to introduce ionizable nitrogen into the epoxy resin. The amine may be one that extends the chain, or not, as desired. A primary or preferably a secondary amine is reacted with the initial epoxy to terminate it, and the grafting reaction is also utilized to introduce ionizable nitrogen side chains into the molecule.

Coating compositions prepared in accordance with this invention offer several advantages. The films formed are clear; there is no phase separation upon coating a solvent-free film. The coating compositions themselves are very stable, with little or no settling, despite prolonged storage. Weathering and mechanical properties are superior.

The Epoxy Resin Component

The epoxy resin component may be either an aliphatic epoxide resin or an aromatic epoxide resin. The most preferred epoxy resins are polyglycidyl ethers of bisphenol A, especially those having an EEW of from about 300 to about 20,000, and preferably from about 500 to about 4,000 or so. The molecular weight of the epoxy resin used may be from about 600 to about 40,000 or higher, and preferably, for cathodic electrocoating compositions, from about 1,000 to about 8,000.

The epoxy resins can be identified primarily in terms of desired molecular weight or EEW. They are more specifically identified in the earlier applications mentioned above. Dow Chemical's D.E.R. 331 epoxy resin is a preferred low molecular weight starting resin, but its EEW is preferably advanced to about 500 to 2,000 or more for use, with one or more of the following exemplary catalysts; sodium or potassium acetate; sodium or potassium carbonate; potassium or sodium hydroxide, and the like. Since some resins are sold in solvents and/or with residual catalysts, care must be exercised.

Dow's D.E.R. 662 epoxy resin, EEW about 575–700, is useful, as are: DER 664, EEW, 875–975; DER 667, EEW 1,600–2,000; DER 668, EEW 2,000–3,500; and DER 669, EEW 3,500–5,500. Shell's Epon epoxy resin 1001, EEW about 450–550, and its Epon Resin 1002, EEW about 600–700 are also useful, as are most higher numbered resins in the Epon epoxy series.

Ordinarily, for cathodic electrocasting compositions, the initial epoxy resin component, whether terminated or not, amounts to from 10% to 60% of the initial weight of the reactants from which the graft polymer resinous reaction product is formed, and preferably, from 15% to 40%, and more preferably, from 20% to 30%, the balance of the film-forming resinous solids being contributed by the acrylic (vinyl) monomers.

If the monomer includes unsaturated amine, the epoxy resin is terminated to eliminate substantially all of the epoxy groups, by reaction with terminating agents such as the phenols, many of the carboxylic acids, primary and secondary amines, mercaptans, alcohols, and even water. A preferred terminating agent is bisphenol A. While some ethylenically unsaturated terminating agents can be used, it is preferred to avoid such materials in order to avoid possible addition polymerization reactions during grafting. If the monomer includes unsaturated epoxide rather than amine, then the epoxy resin component need not be terminated prior to the grafting reaction, although it may be.

Saturated fatty acids and aromatic monocarboxylic acids such as benzoic acid are particularly useful for terminating a diepoxide resin without extending it. The fatty acids can be used in ordinary commercial form and need not be highly purified. Acids such as palmitic, lauric, myristic and stearic are very useful, either in refined form or as highly purified acids.

The primary and secondary amines are satisfactory terminating agents, particularly hydroxyl amines such as, for example, ethanolamine and diethanolamine. The presence of a hydrogen atom that is reactable with an epoxy group is preferable, and for this reason, among others, the tertiary amines are generally not considered to be suitable as terminating agents, except in the case where an ionizing agent is present along with the tertiary amine, and produces ionized, terminated quaternary ammonium salts of the epoxy resin in a single reaction.

When the epoxy resin has been terminated, with the elimination of substantially all of the epoxy groups, relatively high reaction temperatures may be employed for the addition polymerization grafting reaction, if desired.

Condition Polymerizable Monomer

The addition polymerizable monomer, that is reacted in the presence of the epoxy resin component and the free radical initiator to form the resinous reaction mixture, may be a single monomer or a mixture of copolymerizable monomers, the material selected depending upon the objectives to be achieved in terms of properties and economics. The ethylenically unsaturated amines are valuable functional monomers, since they impart base-functionality, and the ethylenically unsaturated epoxides permit a subsequent reaction with amines to impart base-functionality. Other preferred aminated monomers include the C-vinyl pyridines, N-vinyl carbazole, and the like, and example those wherein the vinyl group is attached to radicals such as pyrrolyl, imidazolyl, pyrazolyl, pyridyl, pyrazinyl, pyrimidinyl and the like and, where substituted, substituents may include aliphatic (alkyl), alicyclic, aromatic (aryl), aromatic-substituted aliphatic (aralkyl) or heterocyclic groups.

Also, in some instances, unsaturated primary amines may be useful. However, for purposes of this invention monomers such as N,N-dimethylaminoethyl methacrylate, N-vinylimidazole and the like are preferred.

Very useful water-reducible coating polymers can be produced by using mixtures of a t-amino methacrylate and styrene, enough of the methacrylate being used to develop sufficient base functionality for forming stable dispersions of the resulting resinous reaction product in an acidic aqueous medium.

Generally, for making coating compositions in accordance with the present invention, the addition polymerizable monomer will be selected from two primary classes of such monomeric materials. The selection may

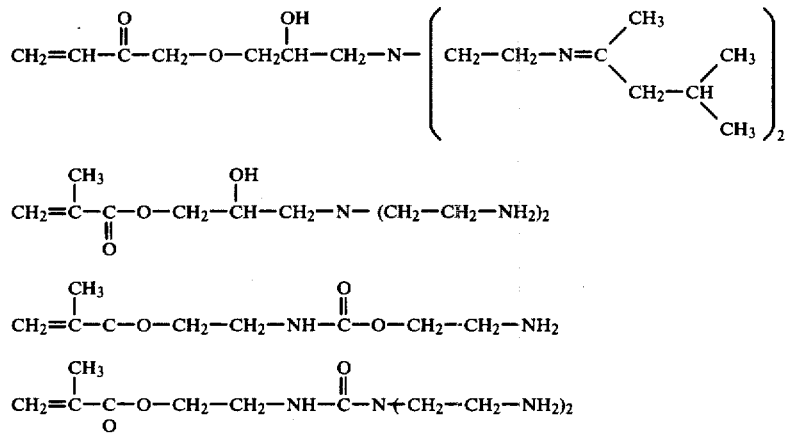

Generally, secondary and tertiary nitrogen-containing monomers are useful, such as aminoalkyl monomers. Such aminoalkyl monomers are ethylenically unsaturated and may include acrylate and/or methacrylate esters having from 1 to 6 carbon atoms in the alkyl radical, such as the aminoethyl, aminopropyl, and aminohexyl esters; mono-N,N-di($C_1$-$C_4$ alkylamino)(-$C_1$-$C_6$ alkyl) esters, such as mono-(N,N-dimethylamino) ethyl ester, mono-(N,N-diethylamino) ethyl ester, and mono-(N,N-dimethylamino)hexyl ester.

Also useful are monocyclic or bicyclic compounds having a five-membered to six-membered heterocycle containing one to three, preferably one to two heteroatoms, and also having at least one basic nitrogen atom bearing a vinyl group. The basic nitrogen atom and the nitrogen atom bearing a vinyl group may be one and the same group. Particularly suitable monocyclic or bicyclic compounds are those which contain no heteroatoms other than nitrogen and for the rest consist of hydrocarbon radicals having not more than twenty carbon atoms. Examples of useful monocyclic compounds are N-vinyl pyrazole, N-vinylimidazole, N-vinylimidazoline, N-vinylpiperidine and analogous compounds which bear methyl, ethyl or propyl groups as substitutes on carbon atoms in the ring. Examples of suitable bicyclic compounds are N-vinylindole and its lower C-alkyl and C-alkoxy analogues.

Generally, any unsaturated secondary or tertiary nitrogen-containing monomer may be employed, for be a single monomer, or a mixture of such monomers that is designed to achieve some particular objective such as, for example, base-functionality.

The first class of monomers, that may be used in the preparation of coating compositions, are the functional monomers. Of these, a first and preferred group includes secondary and tertiary amino acrylates and methacrylates. This category includes, among others, dimethylaminoethyl methacrylate, t-butylaminoethyl methacrylate, and dimethylaminopropyl methacrylamide. A second group of "functional" monomers comprises the epoxy acrylates, such as glycidyl methacrylate. These are ethylenically unsaturated materials that contain an epoxide group and that can be reacted, after grafting, with an amine to impart base functionality.

The second class of monomers that may be used consists of those that have vinyl unsaturation but that are not useful for imparting base functionality. This class includes styrenic monomers, for example, such as styrene, vinyl toluene, divinyl benzene, and the like. It also includes isoprene, conjugated butadiene, and the alkyl esters of an acrylic acid, generally the lower alkyl esters, that is, those esters in which the esterifying group contains from 1 to 4 carbon atoms, and particularly, ethyl acrylate. Other useful monomers in this class include other $C_1$-$C_{18}$ alkyl acrylate esters and methacrylate esters such as, for example, propyl acrylate, isopropyl acrylate, butyl acrylate, isobutyl acrylate, tertiary butyl acrylate, pentyl acrylate, hexyl acrylate, 2-ethyl hexyl acrylate, octyl acrylate, nonyl acrylate, decyl acrylate, lauryl acrylate, isobornyl acrylate, methyl methacrylate, butyl methacrylate, isobutyl methacrylate, hexyl methacrylate, 2-ethyl hexyl methacrylate, octyl methacrylate, and nonyl methacrylate.

Generally, those addition polymerizable monomers that are readily polymerizable under solution polymerization condition are suitable for use. This would include also acetylenically unsaturated materials such as, for example, acetylenic glycols. When a mixture of monomers is used in the production of a water-reducible coating, those monomers selected, other than an acrylic acid monomer, should copolymerize well with the amino acrylate monomers, and should form copolymers that by themselves are not crosslinked at least until cured into a finished coating.

An exemplary monomer initiator mixture for use, that represents a preferred formulation where an unsaturated epoxy is employed, includes:

|  | Parts by Weight |
| --- | --- |
| Butyl acrylate | 44 |
| Hydroxyethyl acrylate | 8 |
| Styrene | 22 |
| Glycidyl methacrylate | 6 |

This mixture would be used with about 7% by weight of BPO based on the monomer mixture, for reaction with 20% or so by weight based on total reaction mixture of DER 661 epoxy resin or the like, to make a useful binder for a cathodic electrocoating composition.

Free Radical Initiator

In order to cause the vinyl monomer to polymerize and to graft, at least one initiator is introduced before, during, or after addition of the monomer to the epoxy resin, with agitation.

As used herein, the term "initiator" or "free radical initiator" has reference to any substance which when added appears simultaneously to promote addition polymerization and grafting. The amount of benzoyl peroxide initiator used may be 3% or more based on monomer, and typically is in the range from about 4% to 7% by weight of total vinyl monomer added, and preferably from about 6% to 7% by weight based on total vinyl monomer, but larger amounts may be used. There is little practical incentive to use larger amounts, however.

Many free radical initiating materials may be used, but benzoyl peroxide is preferred, because of its hydrogen abstraction ability. Those materials that may be used generally include the materials often referred to as peroxide-type catalysts or initiators.

The class of free radical initiators is well-known and is generally useful to some degree, including combinations of free radical initiators and activators for the free radical initiators, including high energy electron beams, under proper conditions.

The preferred class of initiators includes those organic peroxides that have hydrogen abstraction capability. One group of suitable peroxides comprises diacyl peroxides, such as benzoyl peroxide, dicumyl peroxide, lauroyl peroxide, acetyl peroxide, caproyl peroxide, t-butyl perbenzoate, 2,4-dichloro benzoyl peroxide, p-chlorobenzoyl peroxide, and the like. Another group comprises ketone peroxides, such as methyl ethyl ketone peroxide and the like. Another group comprises alkyl hydroperoxides such as t-butyl hydroperoxide, and the like. Another group comprises aqueous hydrogen peroxides. Other useful initiators include cumene hydroperoxide, t-butyl peroxide, and the like. Benzoyl peroxide (BPO) is preferred.

The amount of free radical initiating activity is important. That amount is expressed herein in terms of percentage by weight of benzoyl peroxide based on the total weight of the polymerizable monomer, or equivalent, at the temperature of use, which is generally from about 110° C. to 130° C., or so, for BPO. Such proportion should be at least 3%, and preferably more than 4%, by weight of BPO. Since BPO is an expensive material, no more need be used than is necessary to produce the desired results. When the amount of BPO or equivalent used is more than 3% by weight on monomer, and preferably 6% to 7%, the desired grafting occurs. Other initiators are active at higher temperatures and thus may produce faster reaction times. They are particularly useful when the epoxy resin is terminated prior to grafting.

If the monomer includes glycidyl methacrylate as the functional monomer, a grafting temperature of 150° C. to 160° C. may be used. If the epoxy resin is terminated and no other epoxy groups are present, then a reaction temperature of about 180° C. or so may be used, with an initiator such as dicumyl peroxide, cumene hydroperoxide, or t-butyl perbenzoate.

Generally the initiator is chosen with a half life such that an effective amount is present during the polymerization-grafting reaction, to insure complete reaction. The preferred initiators are those which are virtually completely consumed when the reaction is complete.

The Grafting Reaction Process

The typical grafting reaction generally consists of reacting the epoxy resin component, which may be terminated, with polymerizable monomer that constitutes from about 40% to about 90% of the reaction mixture by weight, in the presence of a peroxide-type free radical initiator. While the reaction may be conducted in the absence of a liquid organic solvent, a solvent system is usually employed to facilitate handling. It is not necessary that the resin be fully dissolved. A preferred solvent system is one made up of two mutually miscible and water miscible solvents.

In general, the polymerization-grafting reaction of this invention proceeds under liquid phase conditions at temperatures in the range from about 100° C. to 130° C., depending on the initiator selected. Reaction times are variable, depending upon starting materials, conditions, and the like; typical reaction times and monomer addition rates range up to about 3 hours, but longer times are feasible.

Under some circumstances, the use of higher temperatures may be desired. In such cases, the reaction temperatures may be as high as about 200° C. if the epoxy resin has been terminated. The rate of reaction is controlled not only by temperature, but also by such variables as the amount and type of initiator(s) used, its concentration, the concentration and type of other solids present, and by other factors.

A preferred technique for conducting such reaction is to place solvent and the epoxy resin in a reactor, heat, and then slowly add, over a period of two or three hours, with mixing, the polymerizable monomer and the free radical initiator. Since the reaction is exothermic, this technique enables the reactants to be maintained at a desired temperature and reaction rate with some degree of control. At the end of the addition to the reactor, the contents of the reactor may be maintained at a preselected holding temperature for some additional period of time, to make sure that the reaction has gone forward to the desired extent.

The particular solvents that may be employed are well known in the art, and include alcohols such as methanol, ethanol, propanol, butanol, and the like, with n-butanol being preferred. Ethylene glycol monobutyl ether, the monohexyl ether of ethylene glycol, and the like, are also suitable.

Solvents for thinning may also be introduced into the system during any preliminary advancement of a low molecular weight liquid epoxy resin, to increase its molecular weight to the desired level for use in the present invention. For this purpose, a preferred solvent is ethylene glycol monobutyl ether, at 15% by weight based on total advancements reactants. It is also preferred to use a mixture of ethylene glycol monobutyl ether and normal butyl alcohol at about 40/60 by ratio for efficiency in terms of performance. Most of the solvent is usually present to moderate viscosity, although some solvent is generally added with the monomer to moderate reactivity. However, the use of a solvent is optional, and if used, the amount of solvent may be in the range from about 5% to 30% by weight of the sum of the other components.

The pressure during the grafting reaction ordinarily is atmospheric, but it can be higher or lower. Reaction temperatures in the range from about 80° C. to about 200° C. are feasible, depending upon the initiator and other operating conditions selected.

Generally, conditions similar to conventional solution copolymerization conditions are preferably employed for the grafting reaction. The monomer and free radical initiator can be batch charged to the epoxy resin but metered addition is preferred for exotherm control. The reaction mixture is normally held for up to three hours at reaction temperature, after addition of monomer has been completed, to complete monomer conversion.

The Resulting Resinous Reaction Products

Under the reaction conditions described, and with at least 3%, 4%, and more preferably 6% to 7% of benzoyl peroxide by weight the monomer mixture, two reaction products are formed at the same time, in association with one another.

One product is the graft polymer. Under the grafting condition described, grafting takes place onto aliphatic backbone carbons of the epoxy resins, at those aliphatic backbone carbon atoms that have either one or two hydrogens bonded thereto in the ungrafted state. Ester-type grafting can be essentially completely eliminated by termination of the epoxy resin prior to grafting. Unreacted terminated epoxy resin is difficult to detect in the reaction mixture. When the epxoy resin component is low, i.e., as little as 5% of the initial reaction mixture, a higher proportion of it may be grafted than otherwise, and little may be present, ungrafted, in the final reaction mixture.

Because of the difficulty of separating the graft polymer per se from the other components of the reaction mixture, molecular weight measurements on it have been difficult to make and at best are probably only approximations. So far as can be determined, the graft polymer preferably has a molecular weight above about 2,500 and preferably, from about 4,000 to 12,000, with its functionality located in side chains bonded to the backbone by stable carbon-to-carbon bonding, so that the graft polymer is resistant to hydrolysis. Generally the resinous reaction products are characterized as film-forming, i.e., they are capable of forming a continuous and cohesive film at room temperature and/or at bake-curing temperatures.

For aqueous coating compositions, the Base Number (N.V.) of the resinous reaction product should be in the range from about 20 to about 100, or preferably from about 30 to 50. Generally this is roughly equivalent to a tertiary amino nitrogen content, NV, of 0.02% to 5% by weight based on resinous reaction product, or values up to 20% based on graft polymer.

Cathodic Electrocoating Compositions

To convert a base-functional resinous reaction product produced in accordance with the present invention to an aqueous suspension, the resinous reaction product, including any solvent present, is mixed with deionized water, using as the ionizing agent an acidic material or a quaternizing agent, which may be a fugitive material. Ordinarily this is done by adding the ionizing agent, with some deionized water, to the resinous blend and mixing vigorously while (optionally) warming, then diluting the reaction mixture with more deionized water as desired.

The amount and kind of ionizing agent employed are somewhat discretionary. The dispersibility or solubility of the ionized resinous reaction product depends upon the strength and degree of ionization. Hence, a strong, highly ionized acid that produces a highly ionizied salt will have greater effect, per mole used, than an acid that produces weakly ionized salts. Generally at least 50% neutralization is advisable. It is usually convenient to calculate the theoretical amount required for 100% neutralization, and to use that amount or something less, depending upon the end product properties desired; greater solubility generally tends to produce greater viscosity.

Typical bath dispersions for cathodic electrocoating will contain not more than 20% and generally from 5% to 20% by weight of total, resinous, film-forming solids. The other materials that can be used, such as pigments, and the manner for incorporating them in the dispersion, are well known. See for example U.S. Pat. No. 4,066,525. When fully formulated and ready for use, the viscosity generally is not more than 100 times that of water at the same temperature, and usually is much less.

An aminoplast resin can be utilized for cross-linking. It can be added to the graft polymer resinous reaction product before neutralization and diluting, or thereafter. Typical aminoplasts include melamine, benzoguanamine, acetoguanamine, and urea resins such as urea formaldehyde. Commercially available aminoplasts which are water soluble or water dispersible and suitable for the instant purpose include Cymel 301, Cymel 303, Cymel 370, and Cymel 373 (all being products of American Cyanamid, Stamford, Conn., and melamine based, e.g., hexamethoxymethyl melamine for Cymel 301), and Beetle 80 resins (products of American Cyanamid which are methylated or butylated ureas). Preferred aminoplast resins are acid modified melamines or benzoguanamines such as Cymel 1141 or Cymel XM1125, products of American Cyanamid.

Other suitable corss-linkers are of the type produced by the reaction of aldehyde and formoguanamine, ammeline, 2-chloro-4,6-diamine-1,3,5′triazine; 2-phenyl-p-oxy-4,6-diamino-1,3,5-triazine; and 2,4,6-triethyl-triamino-1,3,5-triazine. The mono-, di-, or triaryl melamines, for instance, 2,4,6-triphenyltriamino-1,3,5-triazine, are preferred. Aldehydes that can be used to react with the amino compound to form the resinous material are crotonic aldehyde, acrolein, or compounds which generate aldehydes, such as hexamethylene-tetramine, paraldehyde, and the like.

The coating compositions of the present invention can be pigmented and/or opacified with known pigments and opacifiers. For may uses, the preferred major pigment material is titanium dioxide. It may be mixed with other materials such as kaolin clay and furnace black. Generally the pigment is used in a pigment-to-binder ratio of 0.1:1, by weight. The pigment preferably is incorporated into the composition in an amount of from about 10% to 40% by weight, based on resinous film-forming solids in the composition.

The resulting aqueous coating compositions can be applied satisfactorily by any conventional method known in the coating industry. Thus, spraying, rolling, dipping, electrodepositing, or flow coating applications can be used for both clear and pigmented films. However, this invention is primarily concerned with compostiions useful in cathodic electrocoating, and after an application of a layer of solids to a metal substrate from a bath of such a coating under common cathodic electrocoating conditions, such as an applied anode-cathode voltage of about 150 V for 60 seconds or so, blowing, and rinsing in water, the coating is cured thermally at a temperature in the range from about 95° C. to about 235° C. or higher, for periods in the range from 1 to 30 minutes, such time being sufficient to effect complete curing as well as volatilizing of any fugitive component therein. For metal substrates, an electrodeposited coating may be applied at a thickness of 0.2 mils to 3 mils.

For a better understanding of the present invention, the following examples are provided. In this application, all parts are parts by weight, all percentages are weight percentages, and temperatures are degrees Celsius unless otherwise expressly noted. The amine-containing aqueous dispersions of the examples were all stable at room temperature for long periods.

EXAMPLE 1

Amine Functionality Achieved Through The Use of an Unsaturated Amine Monomer

In a four-necked round bottom flask equipped with a nitrogen inlet, thermometer, condenser set for reflux, mechanical stirrer (stainless steel), and an addition funnel, a solution of Dow Epoxy Resin 661 in 2-butoxy-ethanol-1 (46.66 parts, weight non-volatiles, 64%) is heated to 76° C. This epoxy resin is a product of Dow Chemical Company and is reported to have an epoxide equivalent weight (EEW) of 475-575, indicating an average molecular weight of about 1,050. Diethanol amine, 98.6% active, 5.11 parts, is added dropwise over 20 minutes, allowing the temperature to increase to 100° C. After the addition is completed, phenol (1.31 parts) is added through a powder funnel to the reaction mixture. The heat is increased to 130°-140° C. and held for 2 hours.

A monomer and initiator solution is prepared by mixing styrene (19 parts), butyl acrylate (38.6 parts), 2-hydroxyethyl acrylate (7 parts), dimethylaminoethyl methacrylate (5 parts), and dicumyl peroxide (4.2 parts). This monomer solution is then added to the reaction mixture over 4 hours, holding the temperature between 135° C. and 141° C. After the addition is complete, the resinous reaction product is held at 141° C. for 1 hour. Weight non-volatiles, 81.3%; milliequivalents amine per 100 grams non-volatile resin, 36.7; viscosity (6 parts resin, 4 parts 2-butoxyl-ethanol-1), W-X. The amount of t-amino nitrogen in the film-forming resin solids is about 0.5%.

59.2 parts of the above resin is blended with 3.02 parts lactic acid, 6.98 parts of 2-butoxy-ethanol-1 and 156.26 parts water. The resultant product is an aqueous dispersion with good appearance. The dispersion has 21.5% N.V. It was useful per se in formulating cathodic electrocoating compositions.

Thus, pigments can be added and the resulting composition applied by electrodeposition to form a film about 1 mil (25.4 micrometers) in thickness. After curing this film for several minutes at 175° C., a hard glossy finish is obtained.

Similar good results can be obtained where the unsaturated amine is another compound such as, for example, t-butylaminoethyl methacrylate or dimethylaminopropyl methacrylate.

EXAMPLE 2

Variant Process for Producing an Electrocoating Composition Based on an Amine-Containing, Base-Functional Graft Polymer Resinous Reaction Product In a four-necked round bottom flask set up as in Example 1, but with a nitrogen sparge, dimethyl amino propyl amine (448 parts) is heated to 130° C. Dow Epoxy Resin 671 (2800 parts, 75% non-volatiles by weight) (EEW 475-575) is added over 2.5 hours at 131° C. to 140° C. After a 2 hour hold, the xylene (659 parts) (present in the resin as supplied) is removed under reduced pressure, increasing the temperature to 170° C. (maximum vacuum used is 24″ of Hg). The excess amine is driven off at this temperature. The temperature then is reduced to 154° C. and alphaolefin epoxide (260 parts) (a commercial product sold under this name by Union Carbide Corporation, having the structure:

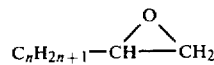

where n is 14 to 16), is added over 1 hour and held for two hours at 150°-155° C. 2-butoxy-ethanol-1 (702 parts) is added to reduce the viscosity. Non-volatiles by weight, 77.5%, milliequivalents of amine per 100 grams non-volatile resin, 255.

In a flask set up as described in Example 1, a quantity of the above resin (46 parts) is heated to 85° C. under a nitrogen blanket. A monomer and initiator solution is prepared by mixing styrene (19 parts), butyl acrylate (38.6 parts), 2-hydroxyethyl acrylate (7 parts), dimethylaminoethyl methacrylate (5 parts), and dicumyl peroxide (4.2 parts) for 30 minutes. This solution is added to the reactor through an addition funnel over 2½ to 3 hours, allowing the temperature to drop to 166° C. The resin is held at 166°-167° C. for an additional 2 hours. Non-volatiles by weight, 81.5%; milli-equivalents of amine per 100 grams of non-volatile, 86.8; color (Gardner-Holdt), 12; viscosity (6 parts plus 4 parts ethylene glycol monobutyl ether), O-P. The amount of t-amino nitrogen in the film-forming resin solids is about 1.8%.

This resin can be dispersed in water by the addition of suitable amounts of lactic acid and water, for at least 50% neutralization. It is useful per se in cathodic electrocoatings or can be formulated further with pigments, cross-linkers, and the like.

Thus, pigments are added and the resulting composition is applied by electrodeposition to form a film about 22 micrometers in thickness. After curing this film for several minutes at 175° C., a hard glossy finish is obtained.

EXAMPLE 3

Water Dispersible Resin Containing Amine Functionality Graft Polymer Resinous Reaction Product: An Amine-Epoxy Adduct 2-butoxy-ethanol-1 (32.9 parts) and Dow epoxy resin 661 (30 parts) are placed in a four-necked round bottom flask equipped as in Ex. 1. A monomer solution is added to the epoxy resin solution through the addition funnel over 2.5 to 3 hours, while the mixture is heated to 115°-120° C. under a nitrogen blanket. The monomer solution comprises 2-hydroxyethyl acrylate (8 parts), butyl acrylate (44 parts), styrene (24 parts), glycidyl acrylate (4 parts), and 78% active wet benzoyl peroxide (6.9 parts).

After the monomer addition is complete, the resin is held at 115°-120° C. for an additional 2 hours. The resin is then cooled. There then is determined % oxirane (0.76); non-volatiles by weight (71.1%); fully body viscosity ($Z_4$-$Z_5$ Gardner-Holdt).

IN a four-necked round bottom flask equipped as above, 103.4 parts of the resin product is heated to 115°-120° C. under a nitrogen blanket with stirring. Methylethanol amine (3.7 parts) is added through the addition funnel over 15-60 minutes, keeping the temperature less than or equal to 120° C. After the addition is completed, the resin is held for 1 hour at 115°-120° C. Milliequivalents (MEQ) of amine per 100 g. non-volatile resin is 60.9. Non-volatiles by weight, 72.3%. Full bodied viscosity, $Z_6$-$Z_8$; Color (Gardner-Holdt), 15. The amount of t-amino nitrogen in the film-forming resin solids is about 0.65%.

The 112.8 parts of the above amine-containing, base-functional, resinous reaction product the following is added: 6.6 parts lactic acid, 4.0 parts 2-butoxy-ethanol-1, 4.0 parts of 2-hexoxyethanol-1, and 872.6 parts water. The resulting aqueous dispersion is suitable for electrocoating.

EXAMPLE 4

Epoxy-Acrylic Grafts for Cathodic Electrocoating

Five experimental epoxy-acrylic graft polymers were prepared, as described in summary fashion in Table 1 below. In each case, the components employed were those indicated in Table 1, in parts by weight.

A 4 neck round bottom flask, equipped as in Ex. 1, was used in preparing these grafts. Initially, 17.3 parts ethylene glycol monobutyl ether and 30 parts of DER 661 epoxy resin were added to the flask. These components were heated to a temperature in the range from 115° C. to 120° C. under a nitrogen blanket, with stirring.

Separately, a mixture was made of ethylenically unsaturated monomer components and benzoyl peroxide, in a small additional amount of ethylene glycol monobutyl ether. Thus, for Run No. 4-1, for which the procedure was exemplary of that for the other runs, the monomer mixture included 7 parts of hydroxyethyl acrylate, 38.5 parts of butyl acrylate, 19.5 parts of styrene, 5.0 parts of glycidyl acrylate, and 6 parts of moist benzoyl peroxide, together with 15.6 parts of ethylene glycol monobutyl ether. This monomer and initiator mixture was then added to the round bottom flask over a period of 2.5 to 3 hours, the temperature being maintained throughout in the range from 115° C. to 120° C., with stirring.

After the addition of the monomer components has been completed, in Runs 4-4 and 4-5, a small amount of additional initiator was added in ethylene glycol monobutyl ether, as indicated. Whether the final initiator was added or not, the mixture at that point was subjected to a two hour hold at the elevated temperature of 115° C.-120° C. The graft polymer resinous reaction product was then cooled and subjected to analysis, with the results reported in Table 1.

TABLE 1

| | Epoxy-Acrylic Grafts with Glycidyl Monomers | | | | |
|---|---|---|---|---|---|
| Run No. | 4-1 | 4-2 | 4-3 | 4-4 | 4-5 |
| ethylene glycol monobutyl ether | 17.3 | 17.3 | 17.3 | 17.3 | 17.3 |
| DER 661[1] | 30 | 30 | 30 | 30 | 30 |
| ethylene glycol monobutyl ether | 15.6 | 15.6 | 15.6 | 15.6 | 15.6 |
| 2-hydroxy-ethyl acrylate | 7 | 7 | 7 | 9.96 | 7.0 |
| butyl acrylate | 38.6 | 38.5 | 38.5 | 38.57 | 38.6 |
| styrene | 20.9 | 19.5 | 14.5 | 17.97 | 18.9 |
| glycidyl acrylate | 3.5 | 5.0 | 10 | 3.51 | |
| glycidyl methacrylate | | | | | 5.55 |
| benzoyl peroxide (moist, 78% BPO) | 6 | 6 | 6 | 5.98 | 6.0 |
| t-butyl perbenzoate | | | | .0014 | .0133 |

TABLE 1-continued

| | Epoxy-Acrylic Grafts with Glycidyl Monomers | | | | |
|---|---|---|---|---|---|
| Run No. | 4-1 | 4-2 | 4-3 | 4-4 | 4-5 |
| ethylene glycol monobutyl ether | | | | .012 | .0133 |
| | 138.9 | 138.9 | 138.9 | 138.9 | 138.9 |
| Theor. % oxirane (Sol'n) | .96 | 1.18 | 1.54 | .96 | 1.09 |
| % Oxirane (sol'n) | .76 | .85 | 1.17 | .62 | .7 |
| NV | 71.1 | 70.7 | 71.3 | 72.3 | 72.1 |
| Visc. (F.B.) | $Z_4 + 9/10$ | $Z_4 + 9/10$ | $Z_4 + 8/10$ | $Z_4 + 7/10$ | $Z_5 + 9/10$ |
| Reduced Visc.[2] | | M | M+ | O-P | |
| Reduced NV | | 49.9 | 49.8 | 49.3 | |
| % Conversion | 98.7 | 98.2 | 99.0 | 100+ | 100+ |

[1] % oxirane = 2.97
[2] In added ethylene glycol monobutyl ether.

The graft polymer resinous reaction products produced from these 5 runs, as reported in Table 1, each contained epoxy functionality. They were converted to ionized cathodic electrocoating resins by reaction with amines. This was accomplished by heating a resin to 115° C. to 120° C. under a nitrogen blanket with stirring in the flask in which it was produced, then adding the indicated amine, as reported in Table 2 below, over a period of 15 to 60 minutes. After completion of the addition of the amine, the mixture was held at that elevated temperature of 115°-120° C., for an additional period of about one hour.

In each case the product was subjected to analysis, with the results reported in Table 2. The abbreviation "MEQ" stands for milliequivalents of base/100 g. of the sample. The absence of an entry in the analytical portion of Table 2 indicates that no observations were made on that particular sample.

Each of the resin products described in Table 2 appears to have properties useful for cathodic electrocoating binders. To demonstrate these properties, two of the cathodic resins, 4-1-1 and 4-1-2 were formulated with a cross-linker component and tested in a cathodic electrocoating system, as reported below in Table 3. In each case, the substrate coated was zinc phosphated steel in the form of a small test panel.

TABLE 3

| | Electrocoating Data | | | |
|---|---|---|---|---|
| Cathodic Resin | 4-1-1 | | 4-1-2 | |
| % Cymel 1141 | 30 | 20 | 25 | 30 |
| Bath pH | 3.75 | 3.80 | 3.85 | 3.90 |
| Applied Voltage (Anode-Cathode) | 150 | 150 | 150 | 150 |
| Conductivity | 850 | 790 | 740 | 800 |
| Time, seconds | 60 | 60 | 60 | 60 |
| % Neutralization NV | 145 | 145 | 145 | 145 |

TABLE 2

| Cathodic Resins Prepared from Grafts | | | | | | | |
|---|---|---|---|---|---|---|---|
| Base-Functional Cathodic Resin Number | 4-1-1 | 4-1-2 | 4-1-3 | 4-2-1 | 4-3-1 | 4-4-1 | 4-5-1 |
| Graft Polymer Resinous Reaction Product from Run Number | 4-1 | 4-1 | 4-1 | 4-2 | 4-3 | 4-4 | 4-5 |
| Wt. Resin | 1052 | 1034 | 740 | 1510 | 1897 | 2295 | 1988 |
| Diethanol amine (86.8%) | 61 | | | | | | |
| Methylethanol amine | | 37 | 33 | 71 | 105 | 67 | 65.7 |
| Eq. Amine/Eq. Epoxy | 1.01 | 1.00 | 1.25 | 1.18 | 1.01 | 1.00 | .65 |
| Viscosity | $Z_6 + 8/10$ | $Z_7$ | $Z_7 + 1/10$ | $Z_7 + 1/10$ | $Z_3 + 4/10$ | $Z_7 + 1/10$ | $Z_7 + 6/10$ |
| NV | 72.7 | 72.3 | 73.5 | 74.1 | 73.0 | 73.9 | 73.4 |
| MEQ (NV) amine/100 g. | 56.1 | 60.9 | 70.6 | 84.1 | 75.1 | 46.3 | 59.9 |
| Reduced Viscosity | | | | U- | | W + 4/10 | T + 9/10 |
| Reduced NV | | | | 49.2 | | 50.1 | 49.1 |
| Color (G-H) | 15 | 15 | 14 | 15 | 14 | 12 | 14-15 |

The five graft polymer resinous reaction products prepared in the runs described in Table 1 were each prepared with 30% by weight epoxy resin and 70% by weight of monomer component. The different levels of glycidyl acrylate and 2-hydroxyethylacrylate, as well as glycidyl methacrylate, that were used, were selected in order to observe the effects of the different proportions employed on solubility and curing of the products.

| (20 min. @ 350° F.) | 15% | 12% | 12% | 12% |
|---|---|---|---|---|
| P/B | .33 | .33 | .33 | .33 |
| Bake Cycle | 350° F.-20' | 350° F.-20' | 350° F.-20' | 350° F.-20' |
| Thickness (mil) | 0.7 | 0.8 | 0.6 | 0.8 |
| Pencil Hardness | 2H | H | 2H | 2H |
| MEK rubs | 200+ | 200+ | 200+ | 200+ |
| Mendrel | 0" | 0" | 0" | 0" |
| Direct impact- | | | | |

TABLE 3-continued

| | Electrocoating Data | | | |
|---|---|---|---|---|
| Cathodic Resin | 4-1-1 | | 4-1-2 | |
| tape off (in-lbs) | 100 | 120 | 140 | 120 |

The results indicate a quite adequate performance of the compositions in the cathodic electrocoating system. Two runs with cathodic resin 4-1-1, with the lower content of cross-linker, would not coat under the same conditions in the same test system.

EXAMPLE 5

Unique Properties of the Graft Polymers

To permit a comparison of the unique properties of the graft polymer resinous reaction products, and dispersions made from them, in accordance with the present invention, and products made by physical blends of epoxy resins and acrylic polymers separately formed and later blended, the following experimental work was performed.

First, a solution an epoxy resin was made up, as reported in Table 4 below as Resin No. 5-1, by mixing DER 661 epoxy resin in ethylene glycol monobutyl ether. Its characteristics were determined and are reported in Table 4, below, under the heading, Resin 5-1.

For comparative purposes, an addition copolymer was prepared separately, as reported below as Resin 5-2. Thus, a mixture was prepared in ethylene glycol monobutyl ether of 2-hydroxyl ethyl acrylate, butyl acrylate, styrene, and glycidyl acrylate, together with the initiator, moist benzoyl peroxide. The monomer mixture was heated to about 115° C.–120° C. in order to form a copolymer from the monomer mixture. After cooling, the properties were determined, as reported below in Table 4 for resin No. 5-2.

TABLE 4

Separate Preparation of Epoxy Resin Acrylic Copolymer

| Resin No. | 5-1 | 5-2 |
|---|---|---|
| ethylene glycol monobutyl ether | 53.8 | 25.3 |
| DER 661 | 100 | — |
| ethylene glycol monobutyl ether | — | 22.2 |
| 2-hydroxethyl acrylate | — | 10 |
| butyl acrylate | — | 55.1 |
| styrene | — | 27.7 |
| glycidyl acrylate | — | 7.2 |
| benzoyl peroxide (moist, 78% BPO) | — | 8.48 |
| | 153.8 | 155.98 |
| Theor. % oxirane | 1.93 | .47 |
| % oxirane (sol'n) | 1.91 | .34 |
| NV | 64.3 | 66.2 |
| Visc. (F.B.) | $Z_1 + 4/10$ | W |
| % Conversion | — | 100+ |

Each of these resins was then reacted with an amine, which was added to each resin solution in ethylene glycol monobutyl ether. The amine was added over a period of 15 to 16 minutes, while stirring the respective resin solution at a temperature of 115° C. to 120° C., and after the addition, the mixture was held at that elevated temperature for an additional hour. The properties of the two base-functional products are reported below in Table 5.

TABLE 5

Reaction with Amine

| Base-functional Resin No. | 5-1-1 | 5-2-1 |
|---|---|---|
| Resin No. | 5-1 | 5-2 |
| Resin, pts. | 900 | 842 |
| Methylethanol Amin, pts. | 80.6 | 13.6 |
| Ethylene glycol monobutyl ether, pts. | 6.5 | 5.4 |
| Eq. Amine/Eq. Epoxy | 1.00 | 1.01 |
| Viscosity | $Z_6 + 7/10$ | Z |
| NV | 67.3 | 68.2 |
| MEQ (NV) | 154.8 | 19.5 |

In order to compare the solubilities of the different materials, each of the following was then neutralized with acetic acid, and its solubility evaluated: first, the base-functional epoxy resin solution, 5-1-1; second, the base-functional acrylic copolymer, 5-2-1; third, a blend of these previous two materials, in the proportions to provide in the blend 30 parts by weight of epoxy resin for each 70 parts by weight of acrylic copolymer; and fourth, a graft polymer resinous reaction product made from an initial reaction mixture containing 30 parts by weight of epoxy resin for 70 parts by weight of acrylic component, and reacted with an amine to be base-functional, as previously described in Table 2, under the caption 4-2-1. The procedure for ionizing these base-functional products, by reacting each with acetic acid, and the results observed, are reported below in Table 6.

TABLE 6

Test For Solubility

| | 5-1-1 I (epoxy) | 5-2-1 II (acrylic) | III (Blend) | 4-2-1 IV (graft) |
|---|---|---|---|---|
| 4-2-1 | | | | 20 |
| 5-2-1 | | 20 | 16.1 | |
| 5-1-1 | 20 | | 7.4 | |
| Acetic Acid | 1.32 | .25 | .69 | .72 |
| Ethylene glycol monobutyl ether | 5 | 5 | | 5 |
| $H_2O$ | 22 | 33 | 35 | 41 |
| Results | clear solution | not soluble; settling out | insolubility observed after the addition of 5 g. of water; the addition of acetic acid and solvent (ethylene glycol monobutyl ether did not affect solubility | brownish dispersion; no visible solid mat. the addition of more acetic acid and solvent (ethylene glycol monobutyl ether) produced a clear colorless solution |

These results demonstrate that the ionized base-functional epoxy resin is soluble; that the ionized, base-functional acrylic copolymer is not soluble; that the blend made by mixing the base-functional epoxy resin with the base-functional acrylic copolymer is not soluble even though neutralized with acetic acid; and that a graft polymer resinous reaction product, made base-functional and ionized in accordance with the present invention, is highly soluble. There is therefore clear evidence of a definite difference in properties between a mechanical blend and a graft polymer resinous reaction product produced in accordance with the present invention.

While amination of terminal epoxide groups, followed by neutralization of the amine groups, can lead to dispersibility or solubility in some cases, it has been found that a much lower content of neutralized tertiary amino nitrogen, located in the side chains of a graft polymer, is needed to establish dispersibility and solubility, than is the case where the neutralized t-amino nitrogen is located solely at the terminal epoxides. This is a truly remarkable, unexpected, and unpredictable property.

A further comparison was made as to weathering properties. It is theorized that weathering or chemical breakdown of an epoxy resin occurs by reason of the extraction of a hydrogen atom from an aliphatic backbone carbon of the epoxy resin, by a free radical. If this theory is correct, than a graft polymer resinous reaction product produced in accordance with the present invention should have superior resistance to weathering, as compared to the unreacted epoxy resin, since grafting has already displaced an available hydrogen from an aliphatic backbone carbon, and has thus improved for weathering resistance to occur.

To test this hypothesis, three paints were evaluated in a Weather-Ometer (Atlas Electric Devices Co.) test instrument. The resin binder for these paints was furnished from three of the acid-neutralized materials described in Table 6 above, namely I, an ionized epoxy; II, an ionized acrylic copolymer, and IV, an ionized graft polymer resinous reaction product in accordance with the present invention. These paints were applied to test panels, cured, and evaluated.

The epoxy-based paint, after exposure in the Weather-Ometer for 100 hours, had deteriorated to the point where it retained only 80% of its original gloss. However, the paint formulated with the ionized graft polymer resinous reaction product of the present invention required 200 hours of exposure in the Weather-Ometer test instrument before it had deteriorated to the point where it retained only 80% of its original gloss.

Accordingly, the weatherability of the graft polymer resinous reaction product-based paint prepared in accordance with the present invention is superior to that of paints made with an epoxy base or an acrylic base by a difference in kind.

EXAMPLE 6

COMPOSITION USEFUL FOR CATHODIC ELECTROCOATING

Termination with Amine After Grafting 450 grams of DER 331 resin and 400 grams of ethylene glycol monobutyl ether were mixed in a reactor (4 liter, 4-neck agitated, glass flask) and heated to 100° C. under a nitrogen atmosphere.

This monomer mixture was made in a separate vessel: 1080 grams butyl acrylate, 540 grams styrene, 180 grams of hydroxyethyl acrylate, 155 grams of 78% benzoyl peroxide in water (130 grams BPO on dry basis), and 340 grams of ethylene glycol monobutyl ether.

The reactor containing the epoxy resin was heated to 118° C. Then the monomer mixture was added over a 2-hour period. The temperature was held at 118° C. for 3 additional hours. At this stage the following properties were determined.

| | | |
|---|---|---|
| Viscosity | = | X (Gardner-Holdt at 25° C.) |
| Non-Volatile Matter | = | 70.9% |
| Oxirane Oxygen | = | 1.5% on nonvolatile matter |

In an agitated vessel 1027 grams of the above reaction product (70.9% resin in solvent) was heated to 116° C. 84 grams of diethanolamine then was added, and the temperature held at 116° C. for 1.5 hours.

The purpose of so adding the amine was to eliminate oxirane groups and produce a cathodically-attractable, modified resin paint binder useful for formulating into an aqueous painting bath for direct current cathodic electrocoating. (The foregoing constituted Ex. 6 of Ser. No. 793,507, supra.)

While graft polymer-containing resinous reaction products of the kind described in this example, that have been made base-functional by the reaction of a primary or secondary amine with the terminal epoxy groups, are often directly useful per se, in many cases, particularly where the initial epoxy resin has a high molecular weight or EEW, or a low oxirane oxygen content, insufficient ionizability may be produced for dispersibility. Accordingly, the technique of increasing ionization that is illustrated in this example is of interest primarily in connection with graft polymers that are or can be made base-functional by reason of sites located in their side chains. Such graft polymers can be rendered more highly ionizable by reacting any other epoxy groups present with a primary or secondary amine, as in this example. This technique is particularly useful for epoxy resins of particularly high molecular weight, or for resinous reaction products that are otherwise difficult to disperse.

GENERAL

The graft polymer resinous reaction product of this invention can be produced with its extent of ionization such that the product remains in solution or in stable suspension almost indefinitely under room temperature storage conditions, without agitation.

The amount of solvent present should be kept at the lowest level needed to facilitate handling. Generally, it is preferred to use a solvent system, most preferably a water-miscible system, although the use of solvent is not essential. The solvent, if present, may be removed in a vacuum evaporation for recovery, if desired, before the electrocoat composition is used.

Water is the only practical dispersing agent where the material is to be ionized. Liquid ammonia and hydrazine are technically feasible, but only water is practical, to permit ionization to occur.

The graft polymer resinous reaction product, prior to dispersion in water, may contain up to about 70% by weight solids and the balance, solvents. During dispersion when water and the ionizing agent are added, the percentages of solids and of organic solvents, based on total composition, are decreased.

CONCLUSION

Compositions prepared in accordance with the present invention are useful directly as cathodic electrocoating compositions, or as the bases from which such compositions can be formulated. Such coatings offer economy, a relatively low ratio of organic solvents to solids, an important environmental consideration, and the achievement of easily handled consistencies with the least organic solvent content feasible in the liquid vehicle.

Metal coating compositions prepared in accordance with the present invention exhibit excellent stability, good turbidity resistance, blush properties, and good adhesion to metal surfaces, whether of aluminum, steel, or tin plate. Such coating compositions can be cured in a few seconds at 450° F. or so (about 230° C.), but are also curable at lower temperatures such as 400° F. (204° C.) and exhibit superior properties as to resin volatilization (fuming).

While compositions prepared in accordance with the invention are primarily intended for use as liquid cathodic electrocoatings, they may be prepared so they can be reduced to powders for application or for reconstitution to flowable form.

While the invention has been disclosed by reference to the details of preferred embodiments thereof, it is to be understood that such disclosure is intended in an illustrative rather than in a limiting sense, and it is contemplated that various modifications in the compositions and processing techniques, in particular, will readily occur to those skilled in the art, within the spirit of the invention and within the scope of the appended claims.

What is claimed is:

1. A coating composition of matter comprising a graft polymer, an ungrafted epoxy polymer, and ungrafted addition polymer, said graft polymer having as one component a 1,2-epoxy resin that has aliphatic backbone carbons that in the ungrafted state have one or two hydrogens bonded thereto, and as another component, at least one addition polymer component of polymerized ethylenic monomers wherein said addition polymer component is grafted by carbon-to-carbon bonding to at least one of said aliphatic backbone carbons of the said 1,2-epoxy resin, said graft polymer having in said addition polymer component copolymerized ethylenically unsaturated amine monomer to provide at least one base-reacting amine group that renders the graft polymer base-functional and said composition having a Base Number of at least 20.

2. The composition of claim 1 wherein the base-reacting amine group comprises a secondary or tertiary amine group.

3. The composition of claim 2 wherein the base-reacting amine group is a unit of said addition polymer component that is derived from an ethylenically unsaturated epoxide that has been reacted, after formation of the addition polymer, with a primary or secondary amine.

4. The composition of claim 2 wherein the base-reacting group comprises tertiary amino nitrogen, and the tertiary nitrogen content of the graft polymer resinous reaction product is up to 10% by weight of the graft polymer.

5. The composition of claim 1, 2, or 3 wherein the base functionality of the graft polymer is sufficiently high to establish the graft polymer as a stable dispersion or solution in an aqueous medium containing an ionizing agent for the base-functional group.

6. The composition of claim 1, 2, 3 or 4 wherein the epoxy resin component prior to grafting has an epoxy equivalent weight of at least 300 and a molecular weight of at least 600, and constitutes from 10% to 60% by weight of the initial reaction mixture from which the graft polymer is formed.

7. The composition of claim 1, 2, 3 or 4 wherein the terminal epoxy groups of the epoxy resin component have been terminated with a primary or secondary amine, thereby contributing to the base-functionality.

8. A coating composition comprising a polymer mixture of a graft polymer, ungrafted epoxy resin, and ungrafted addition copolymer, said graft polymer having as one component an aromatic 1,2-epoxy resin that prior to grafting has an epoxy equivalent weight of at least 300 and a molecular weight of at least 600 and that has aliphatic backbone carbons that in the ungrafted state have one or two hydrogens bonded thereto, and as another component, at least one addition copolymer grafted by carbon-to-carbon bonding to a said aliphatic backbone carbon of the epoxy resin component, said ungrafted addition copolymer and said addition copolymer component comprising at least 40% by weight of said polymer mixture, at least one of the copolymerized units of the addition copolymer component being a base-reacting amine unit derived from polymerized ethylenically unsaturated amine to provide base functional polymer mixture having a Base Number of at least 20.

9. The composition of claim 8 wherein the copolymerized unit of the addition copolymer component, that imparts base-functionality to the graft polymer, is copolymerized dimethyl aminoethyl methacrylate.

10. The composition of claim 8 wherein the copolymerized unit of the addition copolymer component, that imparts base-functionality to the graft polymer, is copolymerized tertiary butyl aminoethyl methacrylate.

11. The composition of claim 8 wherein the copolymerized unit of the addition copolymer component, that imparts base-functionality to the graft polymer, is copolymerized dimethylaminopropyl methacrylate.

12. The composition of claim 8 wherein the copolymerized unit of the addition polymer component, that imparts base-functionality to the graft polymer, is a copolymerized ethylenically unsaturated epoxide that has been reacted with an amine.

13. The composition of claim 12 wherein the ethylenically unsaturated epoxide is glycidyl methacrylate.

14. The composition of claim 9, 10, or 11, wherein the nitrogen content contributed by the said base reacting amine unit is from about 0.5% to about 5% by weight of the graft polymer.

15. The composition of claim 7, 8, 9, 10, 11, 12 or 13, wherein the base functionality of the graft polymer is sufficiently high to establish it as the dispersed or dissolved phase in an aqueous medium containing an ionizing agent for the base functional group.

16. A composition of matter comprising a graft polymer, an ungrafted epoxy resin, and ungrafted addition polymer, said graft polymer having as one component 1,2-epoxy resin that has aliphatic backbone carbons that in the ungrafted state have one or two hydrogens bonded thereto, and as another component, at least one addition copolymer grafted by carbon-to-carbon bonding to a said aliphatic backbone carbon of the epoxy resin, said graft polymer having in its addition copolymer component at least one oxirane group that can be reacted with an amine to render the graft polymer base-functional.

17. The composition of claim 16 wherein the epoxide group is derived from a copolymerized unit of glycidyl acrylate or methacrylate.

18. The composition of claim 16 or 17 wherein the number of epoxide groups per molecule is sufficient so that upon reaction with a secondary amine, the tertiary amino nitrogen content of the composition is from about 0.5% to about 5% by weight of said graft polymer.

19. A coating composition comprising an aqueous vehicle containing as a binder a composition of matter according to claim 1, 2, 3, 4, 7, 8, 9, 10, 11, 12 or 13, together with an ionizing agent for the composition of matter, the ionization being sufficiently high to establish the composition of matter in the aqueous vehicle as a stable dispersion or solution.

20. A cathodic electrocoating composition comprising an aqueous vehicle containing a base-functional resinous binder together with an ionizing agent for the resinous binder, the ionization being sufficient high to establish the composition of matter in the aqueous vehicle as a stable dispersion or solution, the resinous binder being a composition of matter according to claim 1, 2, 3, 4, 7, 8, 9, 10, 11, 12 or 13, wherein the epoxy resin component has in the ungrafted state an epoxy equivalent weight of at least 300.

21. A cathodic electrocoating composition comprising an aqueous vehicle containing a base-functional binder and an ionizing agent for said binder, the ionization produced being sufficiently high to establish the binder in the aqueous vehicle as a stable dispersion or solution, the binder being the graft polymer-containing resinous reaction product obtained by the addition polymerization of ethylenically unsaturated monomer in the presence of an epoxy resin and in the presence of a free radical initiator that has hydrogen abstraction capabilities, under conditions simultaneously to cause addition polymerization of the monomer through its ethylenic unsaturation and carbon-to-carbon bonding of addition polymer to aliphatic backbone carbons of the epoxy resin that in the ungrafted state have bonded thereto one or two hydrogen atoms, to form graft polymer having an epoxy resin backbone component and an addition polymer side chain component, and wherein the addition polymer component that is grafted to the epoxy resin component either includes a unit that renders the graft polymer base-functional or that can be reacted with a primary or secondary amine reactant that renders the graft polymer base-functional.

22. A cathodic electrocoating composition in accordance with claim 21 wherein the ionizing agent is either an acid or a quaternizing reagent.

23. A process for preparing a curable, base-functional resinous composition comprising:
reacting together at a temperature of at least 80° C. and up to 200° C. a 1,2-epoxy resin having an epoxy equivalent weight of at least 300, and that has some aliphatic backbone carbons that have one or two hydrogens bonded thereto, and addition polymerizable monomer having ethylenic unsaturation, the epoxy resin being present in sufficient quantity to provide from 10% to about 60% by weight of the initial reaction mixture, in the presence of an effective amount by weight of a free radical initiator that has hydrogen abstraction capability simultaneously to initiate addition polymerization of the monomer through its ethylenic unsaturation and to produce a reaction product composition that comprises a graft polymer of addition polymer grafted by carbon-to-carbon bonds to aliphatic backbone carbons of the epoxy resin that have one or two hydrogens bonded thereto in the ungrafted state, ungrafted epoxy resin, and ungrafted addition polymer;
incorporating base-functional amine groups in the addition polymer component that is grafted to the epoxy resin wherein the base-functional amine group is derived from an ethylenically unsaturated amine utilized as at least a part of the ethylenically unsaturated monomer in the reaction;
the base-functionality of the reaction product composition being sufficiently high to establish the composition as a dispersion or solution in an aqueous medium containing an ionizing reagent for the base-functional groups.

24. The process of claim 23 wherein the ethylenically unsaturated monomer includes ethylenically unsaturated epoxide, and wherein the base-functional groups are derived by the reaction of a primary or secondary amine with epoxide groups of the addition polymer grafted to the epoxy resin.

25. The process of claim 23 wherein the ethylenically unsaturated amine is dimethyl aminoethyl methacrylate.

26. The process of claim 23 wherein the ethylenically unsaturated amine is tertiary butyl aminoethyl methacrylate.

27. The process of claim 23 wherein the ethylenically unsaturated amine is dimethyl aminopropyl methacrylate.

28. The process of claim 24 wherein the unsaturated epoxy compound is glycidyl methacrylate.

29. The process of claim 23, 24, 25, 26, 27, or 28, wherein the epoxy resin has an epoxy equivalent weight of at least 300, and furnishes from about 10% to about 60% by weight of the initial reaction mixture.

30. The process of claim 29 wherein the epoxy resin is a diglycidyl ether of bisphenol A, has an epoxy equivalent weight of from about 500 to about 4,000, and furnishes from 20% to 30% of the initial reaction mixture.

31. The composition of claim 30.

32. As a coating composition, an aqueous dispersion or solution comprising an aqueous vehicle, a base-functional resinous composition of claim 30, and an ionizing agent for the resinous composition.

* * * * *